UNITED STATES PATENT OFFICE.

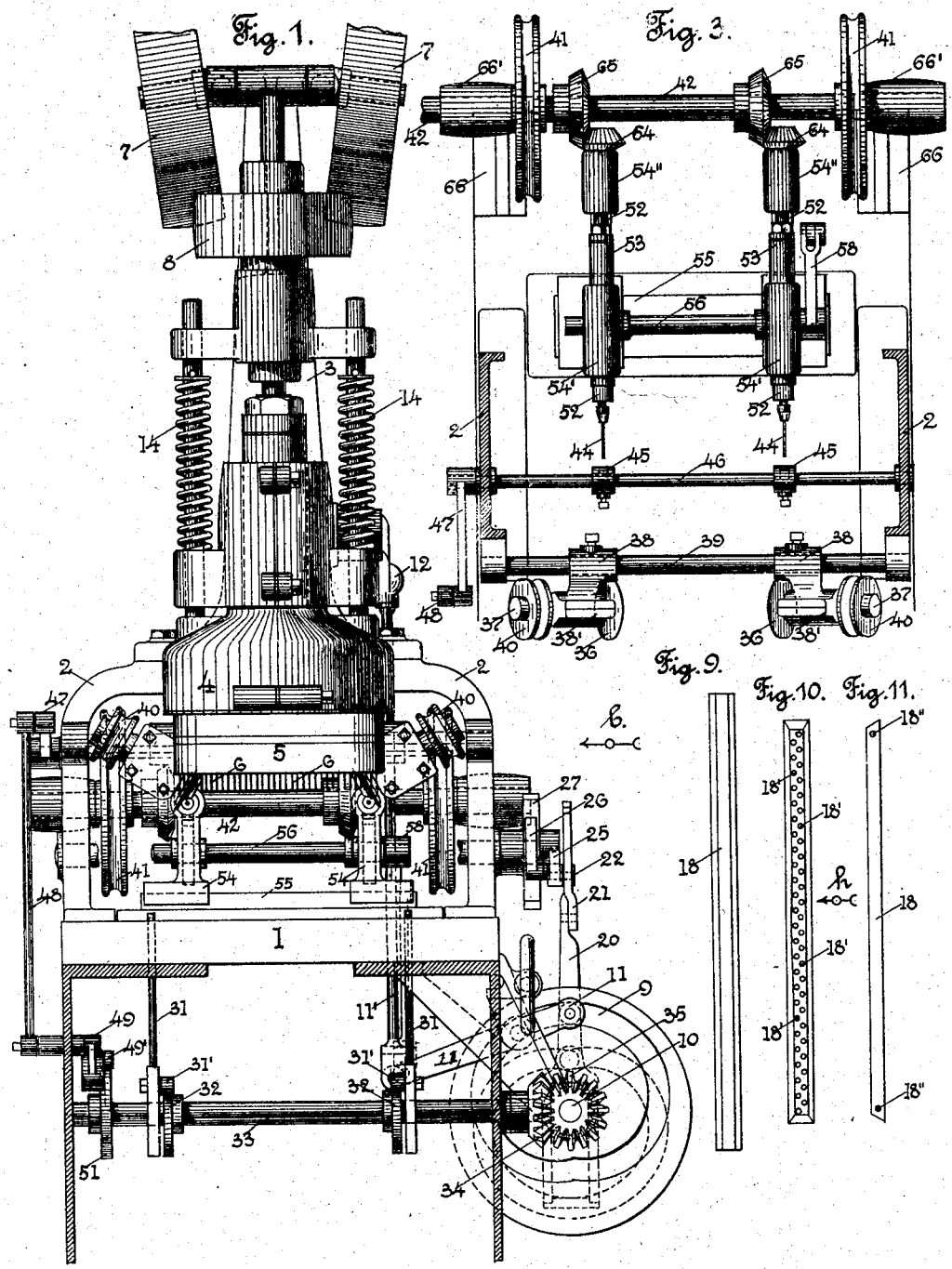

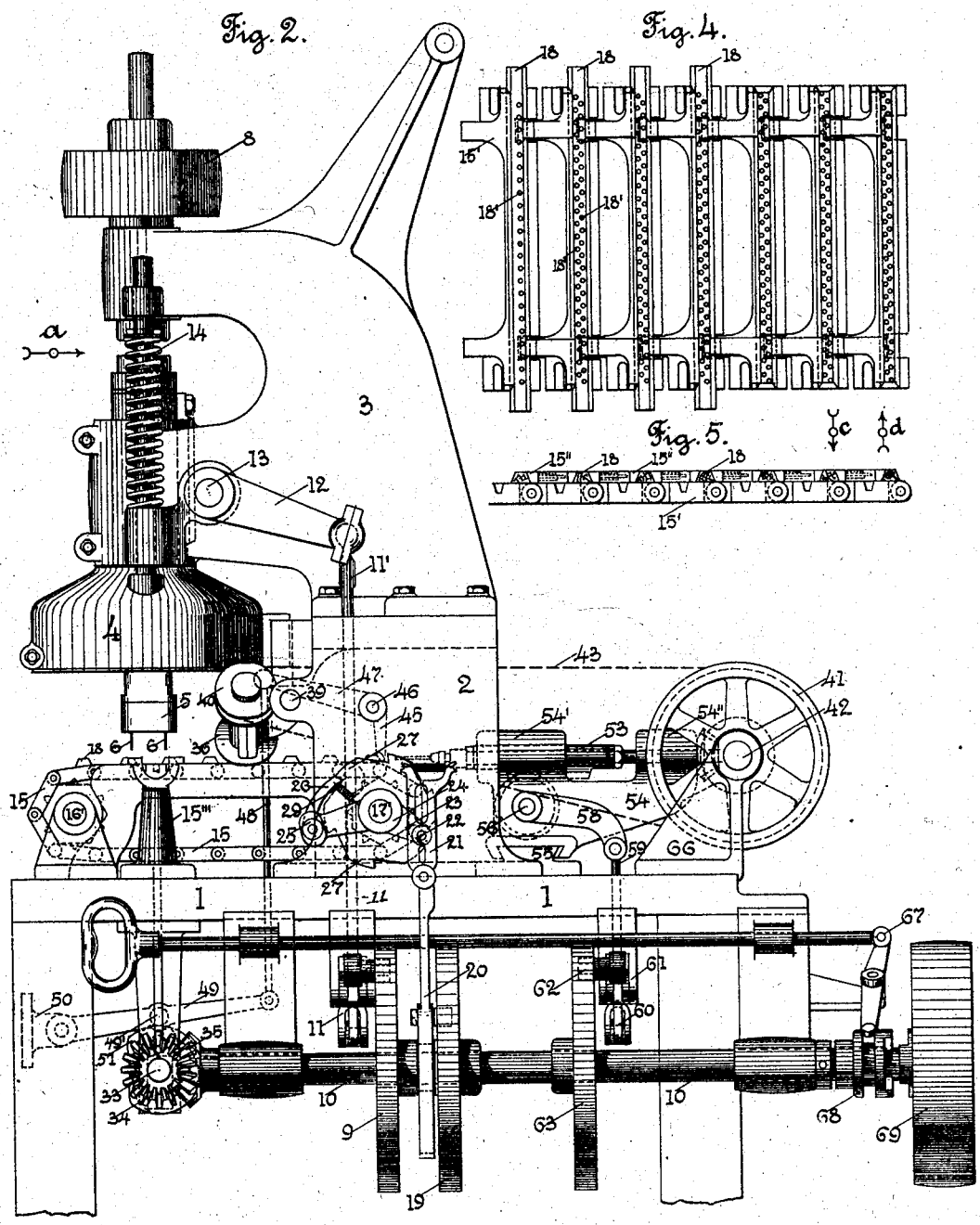

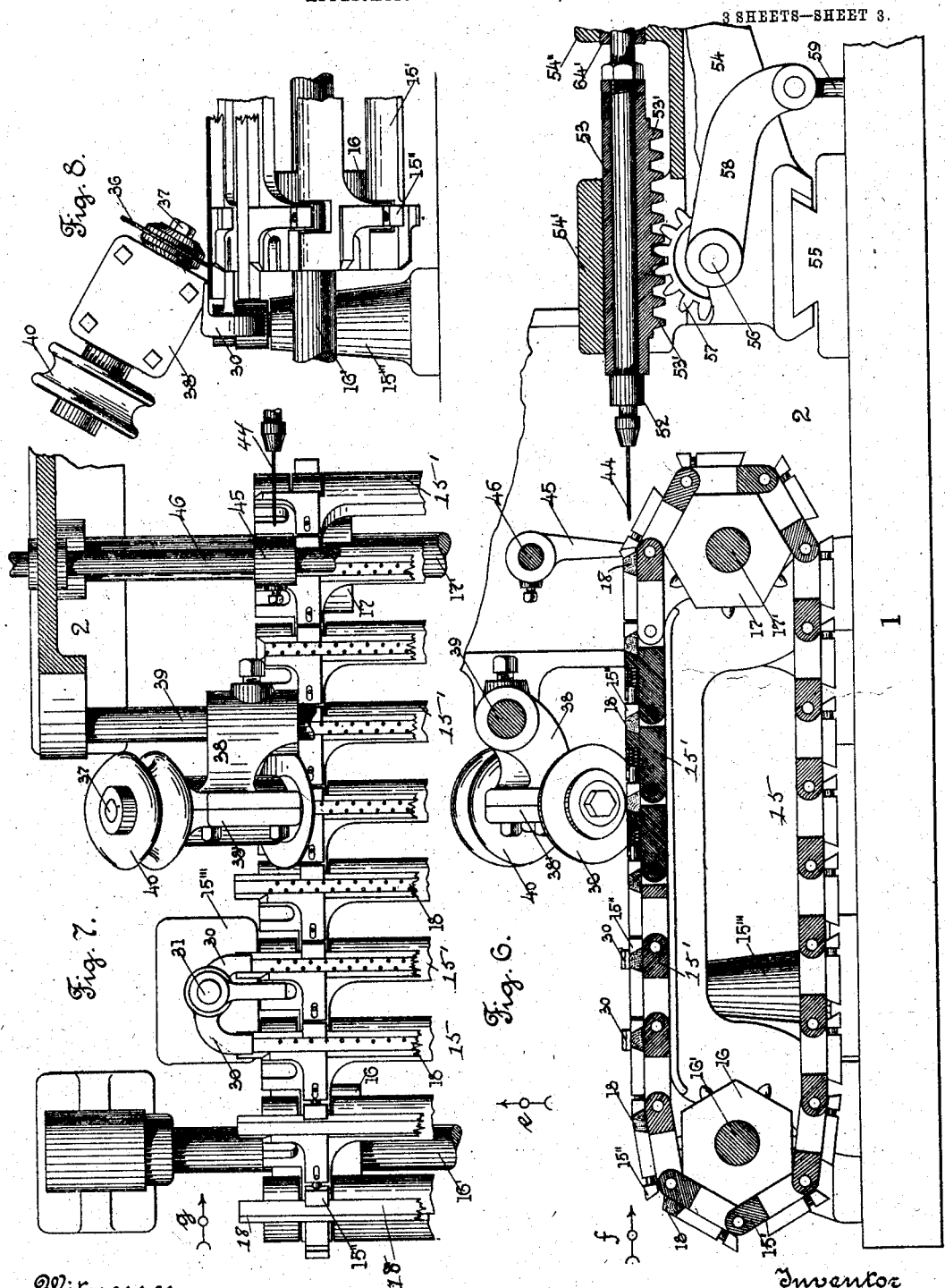

WILLIAM WATTIE, OF WORCESTER, MASSACHUSETTS, ASSIGNOR TO CROMPTON & KNOWLES LOOM WORKS, A CORPORATION OF MASSACHUSETTS.

DRILLING-MACHINE.

No. 796,095.    Specification of Letters Patent.    Patented Aug. 1, 1905.

Application filed March 10, 1904. Serial No. 197,486.

*To all whom it may concern:*

Be it known that I, WILLIAM WATTIE, a citizen of the United States, residing at Worcester, in the county of Worcester and State of Massachusetts, have invented certain new and useful Improvements in Drilling-Machines, of which the following is a specification.

My invention relates to a machine for drilling the holes in the wood bar of a loom pattern-chain to receive the pattern-pins forming the indicating-surfaces for the shedding mechanism. Said pattern-chain bars are particularly used in "dobbies."

In a wood bar for a loom pattern-chain there are a series of holes in parallel rows, which are bored into or through the bar in the direction of its thickness and are adapted to receive the pattern-pins, ordinarily of metal. There is one hole bored through each end of the bar in the direction of its width to receive the metal attaching-eyes, which hold the metal links which connect the bars at their ends, to form an endless pattern-chain, made up of any desired number of bars, and each end of the bar is cut on a bevel. Heretofore it has been customary to use a multiple drilling-machine of any well-known construction and operation having a set of drills to drill the holes for the pattern-pins into or through the blank from which the pattern-chain bar is made (said blank has beveled side edges) and to use a second machine to drill the holes through the ends of the bars for the attaching-eyes and to use a third machine for cutting off the ends of the blank on a bevel, thus requiring three separate machines and three separate operations to make a pattern-chain bar from the blank.

The object of my invention is to combine in one machine a multiple drilling-machine of ordinary construction and operation for drilling the holes in the blank for the pattern-pins, mechanism for drilling the holes in the ends of the blank for the attaching-eyes, and also mechanism for cutting off the ends of the blank on a bevel, so as to be able to make on one machine and at one time a complete pattern-chain wood bar from the blank previously made.

In my improved machine the several operations for completing the pattern-chain bar from the blank are entirely automatic. An endless chain or apron operated automatically holds and carries the blanks under the drills of the multiple drilling-machine. The drills may be arranged in one or more rows to drill simultaneously a row of holes in one or more blanks. The number of drills in a row corresponds to the number of holes in a row to be drilled in the blank. From the drilling-machine the endless apron carries the blanks to two revolving saws, which cut off the ends of the blanks on a bevel, and from the saws the endless apron carries the blanks to two drills, which drill a hole through each end of the blanks for the attaching-eyes. The several operations on the blanks are being performed simultaneous on different blanks in my improved machine, and the finished bars are automatically discharged from the endless apron and new blanks are placed in the endless apron by the attendant or automatically.

My invention consists in certain novel features of construction of my improvements, as will be hereinafter fully described.

I have only shown in the drawings sufficient portions of a multiple drilling-machine of any ordinary and well-known construction, provided in this instance with two sets of drills, and my improvements combined therewith to enable those skilled in the art to which my invention belongs to understand the construction and operation thereof.

Referring to the drawings, Figure 1 is a front view of a machine embodying my improvements looking in the direction of arrow *a*, Fig. 2. Some of the parts shown in Fig. 2 are left off and the supporting-frame is shown in section. Fig. 2 is a side view of the parts shown in Fig. 1 looking in the direction of arrow *b*, same figure. The two belt-pulleys are not shown in this figure, and some parts are shown which are not shown in Fig. 1. Fig. 3 is a sectional plan view of some of the parts shown in Figs. 1 and 2 detached. The endless apron carrying the bars is not shown in this figure. Fig. 4 is a plan view of a portion of the endless apron which carries the pattern-bars, detached, looking in the direction of arrow *c*, Fig. 5. Fig. 5 is an edge view of the apron shown in Fig. 4 looking in the direction of arrow *d*, same figure. Fig. 6 is, on an enlarged scale, a section through the endless chain or apron looking in the direction of arrow *e*, Fig. 7, and also a section through one of the horizontal drills. Fig. 7 is a plan view of the parts shown at the left in Fig. 6 looking in the direction of arrow $f$, same figure. The drill mechanism is not shown in this figure. Fig. 8 is a front view of some of the parts shown in Fig. 7 looking in the direction of arrow $g$, same figure. Fig. 9 is a plan view of a blank from which the pattern-chain bar is made. Fig. 10 is a plan view of the completed pattern-bar, and Fig. 11 is a side view of the bar shown in Fig. 10 looking in the direction of arrow $h$, same figure.

The multiple drilling-machine shown in the drawings may be of any well-known construction and operation, and as the same forms no part of my invention, except as it is used in combination with my improvements, it will not be necessary to describe the same in detail.

In the accompanying drawings, 1 is a frame or table on which the several parts of the machine are supported.

2 represents stands secured to the table 1.

3 is a stand or frame of the multiple drilling-machine secured to the stands 2.

The multiple drilling-machine consists of the head 4 and the drill-holder 5, carrying one or more sets of drills 6 at its lower end. The individual drills 6 are appropriately rotated by suitable operating means—as, for instance, by the pulley 8, which may be driven by suitable belting passing about the same and guided by pulleys 7 7; but such means forms no part of the present invention and needs no further description, since it is well understood in the art. A vertical reciprocating motion is communicated to the head 4 and the drill-holder 5, in this instance by a cam 9 on the driven shaft 10, through lever 11, link-connector 11', and crank-arm 12 on rock-shaft 13, mounted in bearings on the stand 3. (See Fig. 2.) Spiral springs 14 act as cushion-springs.

Extending directly below the sets of drills 6 is an endless chain or apron 15, which is made up of separate bars 15', pivotally linked together in any suitable way and supported at each end on sprocket-wheels 16 and 17 on shafts 16' and 17'. (See Fig. 6.)

The blanks 18 are held on the chain 15, in this instance by two spring-actuated pins 15" on each bar of the chain. The beveled side edges of the blanks extend in a beveled recess in one edge of the bars of the chain and are held therein by the spring-actuated pins 15" on the adjoining bar. (See Fig. 6.)

The endless chain 15 is located just below the drills 6 and in such a position that the drills will operate on the blanks to drill the holes therein for the pattern-pins. On each side of the chain 15 is a post 15''' on the table 1, the upper end of which is in this instance made yoke shape to extend under and support the ends of two blanks during the drilling operation. (See Fig. 2.)

An intermittent motion is communicated to the shaft 17', carrying the sprocket-wheels 17, to cause the movement of the chain 15 to carry the blanks 18 under the drill 6, in this instance by a cam 19, fast on the driven shaft 10, and a vertically-moving link or connector 20, carrying a pin or roll to engage the cam-groove in the cam 19 and also carrying at its upper end a give-way connection 21 to a pin 22 in the end of an arm 23 on a hub 24 of the pawl-supporting arm 25, carrying the pawl 26, which engages with and rotates the ratchet-wheel 27, fast on the shaft 17', carrying the sprocket-wheels 17. (See Figs. 1 and 2.) The hub 24 is loose on said shaft 17'. The spring 29 holds the pawl 26 in engagement with the ratchet-wheel 27.

At each partial rotation of the sprocket-wheels 17 two blanks 18 are brought into position under the two sets of drills 6, as shown in Fig. 2. The multiple drilling-machine is then operated to cause the two sets of drills 6 to simultaneously drill in two separate blanks 18 a series of holes 18' for the pattern-pins. (See Fig. 10.) The operating-cam 19 is so shaped as to communicate, through intermediate mechanism, a second movement to the sprocket-wheel shaft 17' to move the endless chain 15 and carry the blanks which have already been drilled with one set of holes into a position under the drills 6 so that a second set of parallel holes, as shown in Fig. 10, will be drilled in the same blanks. To hold the endless chain 15 in position during the drilling of the holes, I use in this instance fingers 30, carried on the upper end of a vertically-moving rod 31 within the posts 15''' at each side of the endless chain 15. The rods 31 have a vertical motion communicated thereto at the proper time to release the chain and allow it to move and to engage the edges of the chain to hold it in position during the drilling operation, through rolls 31' engaging cams 32 on cross-shaft 33, which has beveled-gear connections, through bevel gears 34 and 35, with the driven shaft 10. (See Figs. 1 and 2.) After the holes 18' have been drilled in the blanks 18 the movement of the endless chain 15 carries the blanks 18 in front of the rotary saws 36, one on each side of the chain. Each rotary saw 36 is fast on the inner end of the inclined shaft 37, which is mounted in bearings 38' on a bracket 38, having a hub thereon which is adjustably mounted on a transverse rod 39, secured to the stands 2. On the outer end of each shaft 37 is fast a grooved pulley 40, which is belted to a grooved pulley 41, fast on the driven shaft 42, as shown by broken lines 43 in Fig. 2. The movement of the apron or endless chain 15 carries the blanks 18 under the rotary saws 36, which act to cut off the projecting ends of the blanks on a bevel. After the blanks 18 have passed under the rotary saws 36 the movement of the apron 15 carries the blanks 18 into position to be operated on by the horizontal drills 44 to have the transverse holes 18'' drilled through their ends.

In order to hold the blanks 18 in position during the drilling of the transverse holes 18'', I provide in this instance two downwardly-extending arms 45, the lower ends of which are adapted to extend in front of and engage the blanks 18, as shown in Figs. 2 and 6. The arms 45 are fast on a rock-shaft 46, mounted in suitable bearings on the stands 2. On the outer end of the rock-shaft 46 is fast a crank-arm 47, which is pivotally connected to the upper end of a link or connector 48. The lower end of said link or connector 48 is pivotally connected to the outer end of a lever 49, which is pivoted at its other end on a stand 50, secured to the frame 1. (See Fig. 2.) The lever 49 carries a roll 49', which travels on the periphery of a cam 51, fast on the shaft 33. The shape of the cam 51 is such that the engaging arms 45 will operate at the proper time to engage and hold the blanks 18 during the drilling operation and release them after they are drilled preparatory to the continued movement of the apron 15.

Each horizontal drill 44 is fast in a drill-spindle 52, which is mounted to have a rotary motion in a sleeve 53 and also have a longitudinal motion with said sleeve. Each sleeve 53 is mounted in a bearing 54' on the upper end of a stand 54. The lower end of the stand 54 has in this instance a recess therein to fit onto and travel on the transverse track 55, secured to the frame 1, in case of any desired lateral adjustment of the stand 54.

A rocking shaft 56 is mounted in the stands 54 and has secured thereon two pinions 57, one for each of the sleeves 53, which have teeth 53' thereon to be engaged by the pinion 57, as shown in Fig. 6. An arm 58, fast on one end of the shaft 56, is connected by a link 59 to one end of a lever 60, pivoted at one end on a hanger 61 on the frame 1 and carrying at its other end a roll 62 to engage a cam 63, fast on the driven shaft 10. (See Fig. 2.) The revolution of the cam 63 through intermediate connections communicates a rocking motion to the shaft 56 and through pinions 57 a reciprocating motion to the sleeves 53 to move forward and back the drills 44. Each drill-spindle 52 extends into an elongated hub 64' (see Fig. 6) on a bevel-gear 64 and is splined to said hub 64' to rotate therewith and at the same time have a longitudinal motion therein. The hubs 64' of the bevel-gears 64 are mounted in bearings 54'' on the stands 54. The bevel-gears 64 mesh with bevel-gears 65, fast on the shaft 42, which is mounted in bearings 66' on stands 66, secured to the frame 1. A pulley (not shown) is fast on one end of the shaft 42 to communicate a continuous rotary motion thereto.

In Fig. 2 is shown a shipper-lever 67, which is adapted to operate a clutch 68 to connect and disconnect the driven pulley 69 on the shaft 10.

From the above description in connection with the drawings the operation of my improvements in drilling-machines will be readily understood by those skilled in the art.

The blanks 18 (shown in Fig. 9) are first placed in the endless chain or apron 15, the machine is then put into operation, and the intermittent movement of the endless chain 15 carries the blanks under the vertically-moving drills 6, which operate to drill one series of holes in two blanks simultaneously. During the drilling operation the endless apron 15 remains stationary. After the drilling operation the endless chain 15 is again moved and a second set of holes is drilled in one of the blanks 18 and a first set of holes in another blank. This operation is repeated until the endless chain or apron 15 has carried the blanks 18 in position to be operated on by the rotary saws 36, which act to cut off the projecting ends of the blanks on a bevel. After the blanks 18 have passed under the saws 36 the continued movement of the endless chain 15 carries a blank 18 in position to be operated on by the horizontal drills 64. The engaging arms 45 are caused to engage the blank at the proper time, and the horizontal drills 44 are moved forward to drill the transverse holes 18'', one in each end of the blank. The drills 44 are then withdrawn and the movement of the endless chain 15 is continued. It will thus be seen that the operation of my machine is entirely automatic and that the blanks are operated on by three different mechanisms, which act simultaneously to make the complete pattern-bar. (Shown in Fig. 10.)

It will be understood that the details of construction of my improvements may be varied, if desired, and the several parts may be made adjustable to operate on blanks of different length, width, and thickness, and one or more series of holes may be drilled for the pattern-pins, as desired.

I do not limit my improvements to making loom pattern-chain bars, as they may be used for any other purpose.

Having thus described my invention, what I claim as new, and desire to secure by Letters Patent, is—

1. In a machine for making loom pattern-chain bars, the combination of a drill-head containing a series of drills, means for operating said drills for drilling holes through said bars, a series of drills disposed at substantially right angles to the first-named series and in the plane of advance of the work for drilling holes through the ends of said bars at right angles to the holes formed by the said first series of drills, inclined cutting mechanism disposed between the two series of drills for beveling the ends of the bars prior to the action of the second series of drills, and means for feeding successive bars simultaneously to the first series of drills, the cutting mechanism and second series of drills.

2. In a machine for making loom pattern-chain bars, the combination of a drill-head containing a series of drills, means for operating said drills for drilling holes through said bars, a series of drills disposed at substantially right angles to the first-named series and in the plane of advance of the work for drilling holes through the ends of said bars at right angles to the holes formed by the said first series of drills, inclined cutting mechanism disposed between the two series of drills for beveling the ends of the bars prior to the action of the second series of drills, an endless chain or apron for feeding successively and simultaneously bars to the first series of drills, the cutting mechanism and the second series of drills, and means for intermittently moving said endless chain.

3. In a machine for making loom pattern-chain bars, the combination of a series of drills, means for operating said drills for drilling holes through said bars, a series of drills disposed at substantially right angles to the first-named series and in the plane of advance of the work for drilling holes through the ends of said bars at right angles to the holes formed by the said first series of drills, inclined cutting mechanism disposed between the two series of drills for beveling the ends of the bars prior to the action of the second series of drills, an endless chain or apron for feeding successively and simultaneously bars to the first series of drills, the cutting mechanism, and the second series of drills, said chain or apron having vertically-yielding clamping devices for securing the bars thereon, and means for intermittently moving said chain or apron.

4. In a machine for making loom pattern-chain bars, the combination of a series of drills, means for operating said drills for drilling holes through said bars, a series of drills disposed at substantially right angles to the first-named series for drilling holes through the ends of said bars at right angles to the holes formed by the said first series of drills, inclined cutting mechanism disposed between the two series of drills for beveling the ends of the bars prior to the action of the second series of drills, an endless chain for feeding the bars successively to the first series of drills, the inclined cutting mechanism and the second series of drills, said chain being formed of a series of bars linked together and spring-actuated pins projecting from one side of each bar for automatically clamping the pattern-chain bars in position on the chain, and means for intermittently moving the chain.

5. In a machine for making loom pattern-chain bars, the combination of an endless chain for feeding successively and simultaneously bars to the operating mechanism, a drill-head containing a series of drills for drilling holes vertically through said bars, a second series of drills disposed at substantially right angles to the first-named series of drills and in the plane of advance of the work for drilling holes through the ends of said bars, intermittently-acting holding-arms for engaging the pattern-chain bars during the action of the second series of drills, means for intermittently moving the endless chain, a lock for holding the chain during its intervals of rest.

6. In a machine for making loom pattern-chain bars, a drill-head containing a series of drills, a second series of drills disposed at right angles to the first series and in the plane of advance of the work, an inclined cutting mechanism disposed between the two series of drills for beveling the ends of the bars prior to the action of the second series of drills, an endless chain for feeding the bars successively to the first series of drills, the cutting mechanism, and the second series of drills, automatically-operated means for successively and simultaneously operating the first-named series of drills, the traveling apron, the locking mechanism and the second series of drills, means for intermittently moving the chain, and a lock disposed at the sides of the chain for holding it in position during the action of the drills.

7. In a machine for making loom pattern-chain bars, a series of drills, a second series of drills disposed at substantially right angles to said first-named series and in the plane of advance of the work, a cutting mechanism, disposed between the first and second series of drills, an endless chain for presenting the bars respectively to the first series of drills, the cutting mechanism and the second series of drills, means for giving the endless chain an intermittent motion, and automatic means for reciprocating the two series of drills.

8. In a machine for making loom pattern-chain bars, a series of drills, a second series of drills disposed at substantially right angles to said first-named series of drills and in the plane of advance of the work, a cutting mechanism situated between these two series, an endless chain for presenting the bars respectively to the first-named series of drills, the cutting mechanism and the second series of drills and means for giving an intermittent motion to the said chain and means for reciprocating the two series of drills, one series being reciprocated independently of the other series.

9. In a machine for making loom pattern-chain bars, a series of drills, a second series of drills disposed at substantially right angles to said first series and in the plane of advance of the work, cutting mechanism disposed between these series of drills, an endless chain for presenting the bars respectively to the first series of drills, the cutting mechanism and the second series of drills and separate cam-operated mechanism for giving an intermittent motion to said endless chain and for reciprocating each series of drills, said cam-operated mechanisms deriving their power directly from a single source.

WILLIAM WATTIE.

Witnesses:
 JOHN C. DEWEY,
 M. HAAS.